(12) United States Patent
Saviano

(10) Patent No.: US 6,181,865 B1
(45) Date of Patent: Jan. 30, 2001

(54) SELF ALIGNING OPTICAL FIBER TERMINATOR

(75) Inventor: Paul G. Saviano, Norwalk, CT (US)

(73) Assignee: PerkinElmer Instruments LLC, Norwalk, CT (US)

(*) Notice: Under 35 U.S.C. 154(b), the term of this patent shall be extended for 0 days.

(21) Appl. No.: 09/285,282

(22) Filed: Apr. 2, 1999

(51) Int. Cl.⁷ ..................................................... G02B 6/00
(52) U.S. Cl. .............................. 385/139; 385/56; 385/78
(58) Field of Search ................................. 385/17, 62, 76, 385/78, 81, 87, 92, 139, 141

(56) References Cited

U.S. PATENT DOCUMENTS

| 4,354,731 | 10/1982 | Mouissie | 350/96.21 |
| 4,679,895 | * 7/1987 | Huber | 385/81 |
| 5,074,636 | 12/1991 | Hooper | 385/76 |
| 5,504,825 | 4/1996 | Saito et al. | 385/17 |
| 5,796,894 | * 8/1998 | Csipkes et al. | 385/56 |

FOREIGN PATENT DOCUMENTS

| 0016240 | 2/1977 | (JP) . |
| 0250312 | 12/1985 | (JP) . |
| 0083709 | 4/1987 | (JP) . |
| 0104005 | 5/1988 | (JP) . |
| 0104006 | 5/1988 | (JP) . |

OTHER PUBLICATIONS

IBM Technical Disclosure Bulletin—vol. 22, No. 10, Mar. 1980, p. 4475 "Fiber–optic Male Connector".

* cited by examiner

Primary Examiner—Frank G. Font
Assistant Examiner—Sang H. Nguyen
(74) Attorney, Agent, or Firm—St. Onge Steward Johnston & Reens LLC

(57) ABSTRACT

A optical fiber terminator comprising: a cylindrical housing having a through bore that is cylindrical at one end and conical at the other end, a frusto-conical collet mounted inside the conical bore where the collet has a stepped cylindrical through bore with a diameter corresponding to the diameter of an industry standard ST ferrule; and, a means to receive and retain an industry standard ST termination attached to the end of the housing having the conical bore. The housing and collet assembly provide a means for precisely placing the tip of the optical fiber ferrule in both a radial and axial direction to facilitate using standard ST terminations.

6 Claims, 3 Drawing Sheets

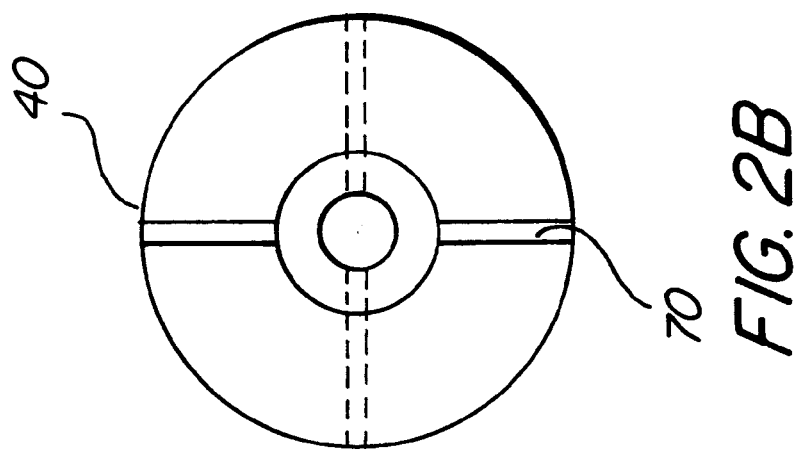
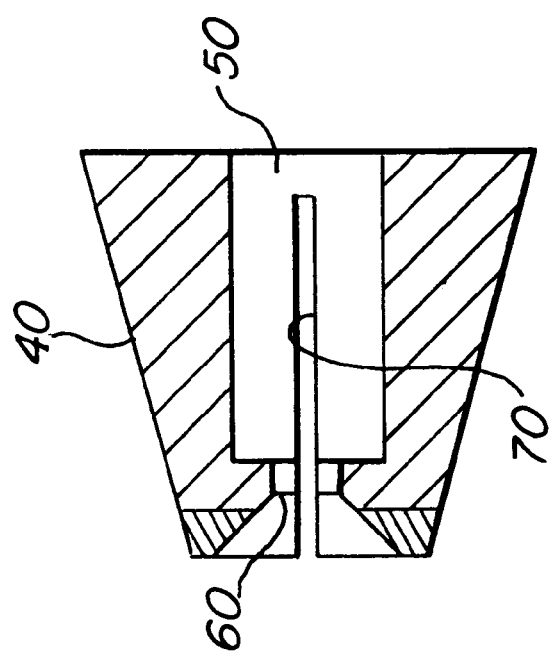
FIG. 2B
FIG. 2A

SELF ALIGNING OPTICAL FIBER TERMINATOR

FIELD OF THE INVENTION

This invention generally relates to an optical fiber terminator, specifically one that aligns the tip of the fiber both axially and concentrically.

BACKGROUND OF THE INVENTION

ST style terminators provide a convenient method of terminating optical fibers in both digital and analog applications. The qualitative study of materials using light usually requires that a sample be illuminated and the light either reflected from or transmitted through the sample be analyzed. When an optical fiber is used to carry light to a sample, the light diverges rapidly as it exits the optical fiber tip and must be controlled and made into a collimated beam. When light has passed through or has reflected from a sample it must be made to converge, or focus, so that the light can be introduced into the small core at the tip of the optical fiber for efficient transmission to an analyzing instrument. In both cases, a focusing element is placed at a precise distance from the tip of the optical fiber. The distance from the optical fiber to the focusing element, as well as the concentricity of the optical fiber and the focusing element, are critical to ensure a reliable light signal for these applications.

Industry standard ST terminations are not designed to accurately control the position of the tip of the optical fiber. The main component of an ST terminator is a cylindrical ferrule mounted in a push and twist type mechanism, commonly known as a "bayonet" style connection. One end of the ferrule has an external shoulder and is constructed so that an optical fiber may be inserted. The other end has an opening that is smaller than the diameter of the ferrule, which forms an internal shoulder. Upon insertion, the tip of the optical fiber extends through the internal shoulder and registers axially inside the cylindrical ferrule flush with the outside face. Standard ST terminations rely on contact with the external shoulder of the connector, distal to the tip, for positioning. The ST termination process, during initial manufacture and during field repair, involves abrasively polishing the end of the ferrule having the internal shoulder and the optical fiber within. This process introduces an inconsistency in the final length of finished ferrules, as they extend from the external shoulder of the connector, of a significant fraction of a millimeter from connector to connector. Attempting to control axial position, distal to the optical fiber tip does not account for these variations and results in a similar variation in distance between the focusing element and the tip of the optical fiber. A means for precisely positioning the tip of any ST optical fiber terminator both axially for focusing and radially for concentricity would ensure consistency of optical focus and efficient light transmission with this common and convenient style of optical fiber connector.

SUMMARY OF THE INVENTION

It is an object of the invention to improve the axial and concentric positioning of an industry standard ST termination. This invention makes use of the tip of the finished ST ferrule, the precision diameter of the ferrule and the spring loaded design of the ST termination to precisely and repeatedly align any ST terminated fiber with an optical element. A conical collet, having a concentric counter bore, fits loosely within a mating conical housing. The concentric counter bore has a length somewhat shorter, and a diameter corresponding to the highly accurate diameter of a standard ST ferrule. When an ST ferrule is inserted, the tip of the ferrule presses against the bottom of the counter bore, causing the outside surface of the conical collet to travel into and wedge against the mating surface of the conical bore. The collet travel is precisely controlled, causing the ST tip to be precisely positioned axially within the housing. As the collet wedges against the conical housing, it in turn compresses around the ST ferrule causing the ST tip to be precisely positioned concentrically within the housing.

BRIEF DESCRIPTION OF THE DRAWINGS

FIG. 2A is a cross sectional view of the conical collet.

FIG. 2B is an end view of the conical collet.

DETAILED DESCRIPTION OF THE INVENTION

Figure 1:
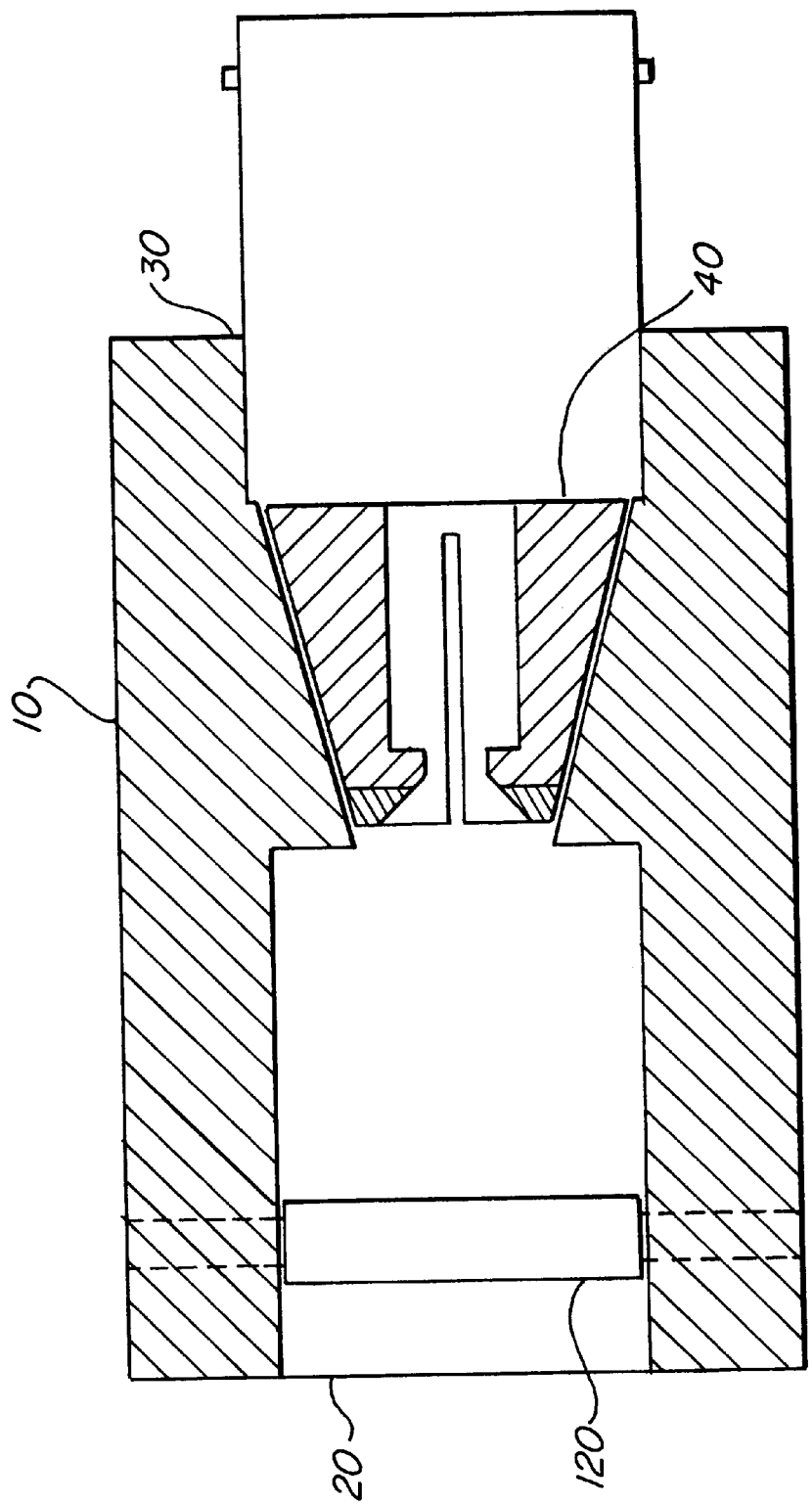
FIG. 1 is a cross sectional view of a terminator in accordance with the invention.

FIG. 1 shows a cross sectional view of a terminator according to the invention. A housing 10 is constructed having a through bore that is cylindrical at one end and conical at the other. The housing end having the cylindrical bore 20 is constructed so that an optical element 120, such as a lens, may be mounted to, or in fixed relationship to, the housing. The housing end having the conical bore 30 is constructed to receive and loosely retain a conical collet 40 within the conical bore 30. The housing's conical bore matches the outside surface of the conical collet. The conical bore end of the housing is also adapted to receive and retain an industry standard ST bayonet style termination.

FIGS. 2A and 2B show two views of the conical collet 40. The conical collet is constructed with a through bore that is cylindrical at one end 50 and forms a shoulder 60 at the other end. The diameter of the cylindrical portion of the through bore corresponds to the diameter of an industry standard ST ferrule. The collet has a plurality of slots 70, equally spaced, that are slotted alternately from front to back and back to front, of sufficient length and depth to allow the collet to compress and decompress uniformly. The collet is slotted and its internal diameter is expanded slightly, giving it some spring pressure to enhance the repeated insertion and removal of the ST termination ferrule.

Figure 3:
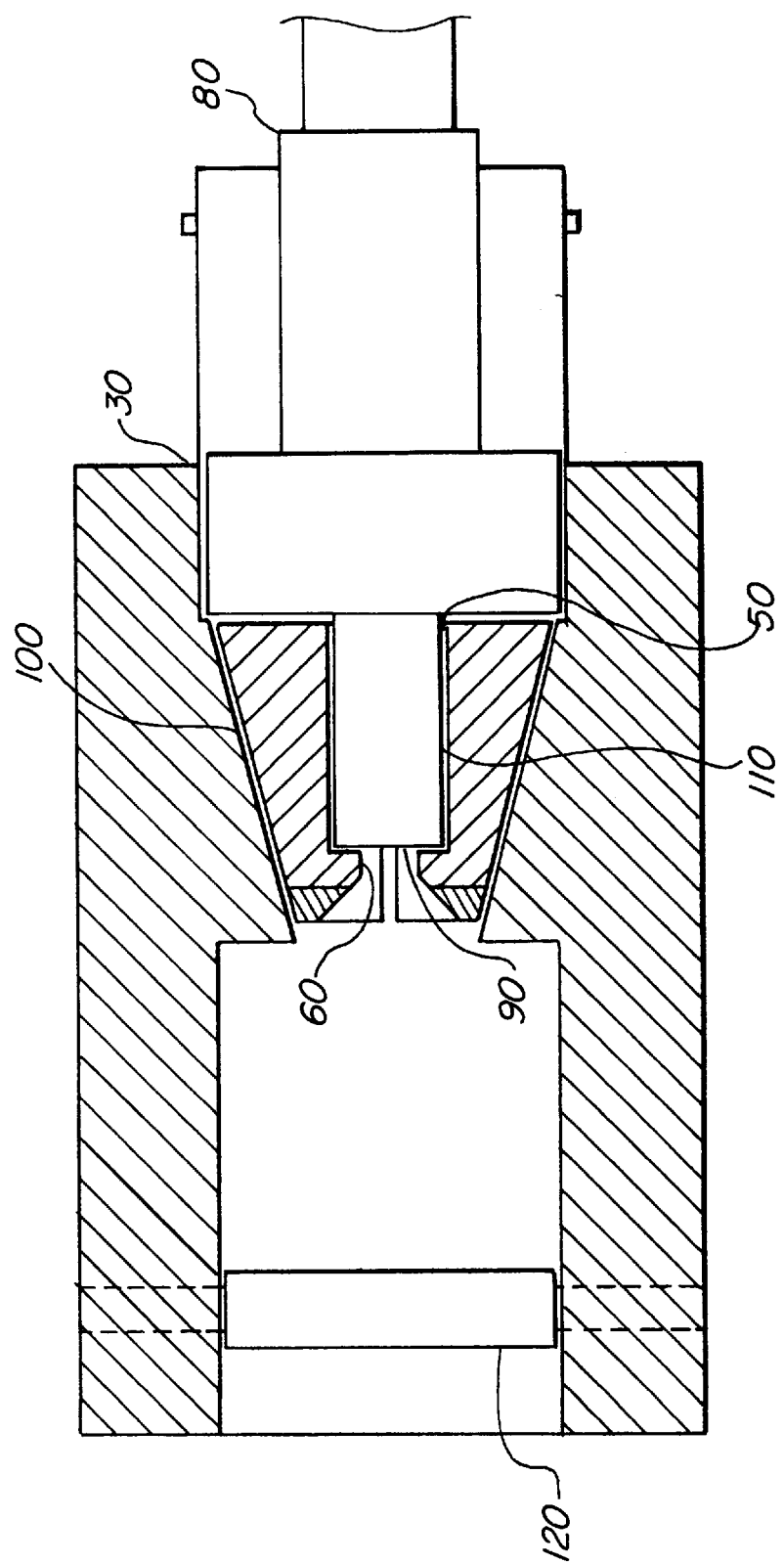
FIG. 3 is a cross sectional view of the terminator of FIG. 1 as used with a standard ST optical fiber terminator.

FIG. 3 shows the invention being used with an industry standard ST termination 80. An ordinary ST terminated optical fiber connector is inserted into the housing end having the conical bore 30. The housing is adapted to receive and retain the connector using a bayonet style connection. The bayonet style connection is integral to ST connectors. The end 90 of the ST ferrule 110 passes into the cylindrical through bore 50 of the conical collet and registers axially at the conical collet's shoulder 60. After contacting the collet's shoulder, the force behind the tip of the ferrule causes the collet to travel further into the housing and the mating conical bore of the housing 100 uniformly contacts the collet in a wedging fashion. The collet reduces slightly in diameter, compressing down into the housing bore 100, until the collet's cylindrical bore 50 contacts and exerts a positive, inward radial clamping force against the length of the ferrule 110 that it contains. When this occurs, the collet can travel no further into the housing. The ST connector is then fastened in place using the bayonet mechanism that is integral to ST style connectors. As stated above, the planar surface of the ferrule tip is the initial contact between the ferrule and the collet's shoulder. The depth to which the tip pushes the collet into the mating conical housing is determined by the diameter of the ferrule, which is closely controlled. The final position of the ferrule tip is determined by the trigonometric relationship between the ferrule diameter and the half angle of the outside conical surface of the collet. In this embodiment a 15 degree half angle provides stable concentric positioning and satisfactory axial position control of the ferrule tip in light of the consistency in ST ferrule diameters.

In this invention, variations in the position of the ferrule tip are due to deviation in the diameter of the ST ferrule, deviation from ideal of the conical angles in the housing and the collet and deviation in the concentricity of the various bores. The maximum axial range of ferrule tip positions due to the ST ferrule diameter will vary according to the formula:

$$b = \frac{a}{2}(\cot A)$$

where b is the change in the axial position of the tip of the optical fiber as it deviates from the theoretical;
a is the deviation of the ferrule diameter from the nominal 2.50 mm; and
A is the half angle of the cone.

Since ST ferrule diameters are typically within a tolerance range of 0.005 millimeters for a conical half angle of 15 degrees, the maximum range of axial position of the ferrule tip b is:

$$b = \frac{0.005}{2}(\cot 15°) \text{ or } 0.0187 \text{ mm}$$

The maximum range of ferrule tip positions controlled by the deviation from ideal of the conical angles in the housing and on the collet can be predicted in a similar fashion. Using a manufacturing tolerance of ±0.1° for any half angle, the sum of the errors between the housing bore and the conical collet angle is a maximum of 0.2° producing deviations in both the axial and radial directions. Considering the worst case, where the half angle of the collet is favored toward the plus side of the tolerance range and the conical half angle of the housing bore is favored toward the minus side of the tolerance range, causing the collet to contact the housing at the collet's large diameter, the deviations will vary according to the formulae:

$$y_r = \left(\frac{D}{2}\right) - X_h \cos(\alpha + 0.2°) \text{ and}$$

$$x_a = X_h \sin(\alpha + 0.2°) - L$$

where $y_r$ is the radial displacement of the ferrule tip;
$x_a$ is the axial displacement of the ferrule tip;
D is the large diameter of the collet;
L is the length of the ferrule inserted in the collet;
$X_h$ is a length of a line from the center of the ferrule tip inserted in the collet to a point on the large diameter of the collet where $$X_h = \sqrt{L^2 + \left(\frac{D}{2}\right)^2}$$

and
α is the angle between the plane of the large diameter of the collet and $X_h$, $$\alpha = \cot\left(\frac{L}{\frac{D}{2}}\right)$$

Using 4.5 mm as the value for L and 7 mm as the value for D yields the following values for $X_h$ and α

$$X_h = \sqrt{4.5^2 + \left(\frac{7}{2}\right)^2} = 5.7 \text{ mm and}$$

$$\alpha = \cot\left(\frac{4.5}{\frac{7}{2}}\right) = 52.13°$$

and results in the following values for $y_r$ and $x_a$:

$$y_r = \left(\frac{7}{2}\right) - 5.7\cos(52.13° + 0.2°) = 0.0167 \text{ mm}$$

$$x_a = 5.7\sin(52.13 + 0.20) - 4.5 = 0.0118 \text{ mm}$$

The range of ferrule tip positions controlled by concentricity deviations among the various bores can be determined from the manufacturing tolerances. Using a manufacturing tolerance of ±0.0127 mm concentricity, and assuming the maximum error among the cylindrical and conical bores in the housing and the cylindrical bore in the collet, yields an error in radial placement of the ferrule tip of 0.0381 mm.

In accordance with this invention, the total variations in the position of the ferrule tip due to deviation in the diameter of the ST ferrule, deviation from ideal of the conical angles in the housing and the collet and deviation in the concentricity of the various bores becomes 0.0305 mm in the axial direction and 00548 mm in the radial direction. This is approximately nine times better axial positioning accuracy than can be obtained using standard ST hardware and ferrules that can typically vary by 0.28 mm in length after polishing, and at least as good radial positioning as found in standard ST hardware.

What is claimed is:
1. A optical fiber terminator comprising:
a frusto-conical collet having a large end and a small end, said collet having a stepped cylindrical through bore with a large diameter at the large end and a small diameter at the small end, said small diameter forming an internal annular shoulder inside said small end, said large diameter corresponding to the diameter of an industry standard ST ferrule;
a cylindrical housing having a through bore, an optical mounting end and a connector end, said through bore being cylindrical at said optical mounting end, said through bore in said connector end being conically shaped to be in close contact with said collet, said connector end constructed to receive and retain an industry standard ST termination; and said collet mounted slidingly inside said conical through bore in said housing.

2. The invention in claim 1 where said collet has a plurality of slots, equally spaced, that are slotted alternately from front to back and back to front, allowing for uniform compression and decompression of said collet around said ferrule.

3. The invention in claim 1 where said optical mounting end is constructed to allow mounting optical elements inside, outside or in fixed relation to said housing.

4. A optical fiber terminator comprising:

an industry standard ST termination comprising a cylindrical ferrule mounted in a bayonet style fastening mechanism, said cylindrical ferrule further comprising a first end having an external shoulder and constructed to receive an optical fiber and a second end having an opening, smaller than the diameter of said ferrule, which forms an internal annular shoulder at said second end;

a frusto-conical collet having a large end and a small end, said collet having a stepped cylindrical through bore with a large diameter at the large end and a small diameter at the small end, said small diameter forming an internal annular shoulder inside said small end, said large diameter corresponding to the diameter of an industry standard ST ferrule;

a cylindrical housing having a through bore, an optical mounting end and a connector end, said through bore being cylindrical at said optical mounting end, said through bore in said connector end being conically shaped to be in close contact with said collet, said connector end constructed to receive and retain an industry standard ST termination; and said collet mounted slidingly inside said conical through bore in said housing so that upon insertion of said second end of said ST termination into said connector end of said housing, said second end of said ST termination enters said cylindrical through bore of said collect and contacts said collet's internal annular shoulder, causing said collet to travel into said housing and said conical bore of said housing to uniformly contact said surface of said collet in a wedging fashion, further causing said collet to reduce slightly in diameter until said collet's cylindrical bore contacts said ferrule of said ST termination, still further causing said second end of said ST termination to register axially and radially with respect to said optical mounting end of said housing.

5. The invention in claim 4 where said collet has a plurality of slots, equally spaced, that are slotted alternately from front to back and back to front, allowing for uniform compression and decompression of said collet around said ferrule.

6. The invention is claim 4 where said optical mounting end is constructed to allow mounting optical elements inside, outside of in fixed relation to said housing.

* * * * *